(12) United States Patent
Stoica

(10) Patent No.: US 6,728,701 B1
(45) Date of Patent: Apr. 27, 2004

(54) METHOD AND APPARATUS FOR DATABASE RETRIEVAL UTILIZING VECTOR OPTIMIZATION

(75) Inventor: Emilia Stoica, Pittsburgh, PA (US)

(73) Assignee: Claritech Corporation, Pittsburgh, PA (US)

(*) Notice: Subject to any disclaimer, the term of this patent is extended or adjusted under 35 U.S.C. 154(b) by 0 days.

(21) Appl. No.: 09/551,015

(22) Filed: Apr. 18, 2000

(51) Int. Cl.⁷ .............................................. G06F 17/30
(52) U.S. Cl. ..................... 707/3; 707/1; 707/6; 704/1; 704/9
(58) Field of Search .................. 707/1–10, 100, 707/102, 104.1; 704/1, 9

(56) References Cited

U.S. PATENT DOCUMENTS

| | | | | |
|---|---|---|---|---|
| 5,652,829 A | * | 7/1997 | Hong ........................ | 706/59 |
| 5,659,766 A | * | 8/1997 | Saund et al. ................ | 704/9 |
| 5,675,819 A | * | 10/1997 | Schuetze ..................... | 704/9 |
| 5,694,594 A | * | 12/1997 | Chang ........................ | 707/6 |
| 5,774,888 A | * | 6/1998 | Light ......................... | 707/5 |
| 5,777,892 A | * | 7/1998 | Nabity et al. .............. | 702/143 |
| 5,778,363 A | * | 7/1998 | Light ......................... | 707/5 |
| 5,794,178 A | * | 8/1998 | Caid et al. .................. | 704/9 |
| 5,806,061 A | * | 9/1998 | Chaudhuri et al. ......... | 707/3 |
| 6,026,389 A | * | 2/2000 | Nakajima et al. ........... | 707/1 |
| 6,070,133 A | * | 5/2000 | Brewster et al. ............ | 704/9 |
| 6,070,134 A | * | 5/2000 | Richardson et al. ........ | 704/9 |
| 6,105,023 A | * | 8/2000 | Callan ........................ | 707/5 |
| 6,115,709 A | * | 9/2000 | Gilmour et al. ............. | 707/9 |
| 6,233,575 B1 | * | 5/2001 | Agrawal et al. ............ | 707/6 |
| 6,314,420 B1 | * | 11/2001 | Lang et al. ................. | 707/3 |
| 6,327,590 B1 | * | 12/2001 | Chidlovskii et al. ........ | 707/5 |
| 6,338,057 B1 | * | 1/2002 | Weeks ........................ | 707/3 |
| 6,377,949 B1 | * | 4/2002 | Gilmour ..................... | 707/10 |
| 6,389,412 B1 | * | 5/2002 | Light ......................... | 707/3 |
| 6,473,753 B1 | * | 10/2002 | Katariya et al. ............ | 707/5 |
| 6,510,406 B1 | * | 1/2003 | Marchisio ................... | 707/3 |
| 6,601,026 B2 | * | 7/2003 | Appelt et al. ............... | 707/3 |

OTHER PUBLICATIONS

"A Network Approach to Probabilistic Information Retrieval"—K. L. KWOK—ACM Transaction Infromation Systems, vol. 13, No. 3, Jul. 1995, (pps: 324–353).*

* cited by examiner

*Primary Examiner*—Shahid Alam
*Assistant Examiner*—Anh Ly
(74) *Attorney, Agent, or Firm*—Jones Day; Blaney Harper; Russell O. Paige

(57) ABSTRACT

A technique for optimizing the number of terms in a profile used for information extraction. This optimization is performed by estimating the number of terms which will substantively affect the information extraction process. That is, the technique estimates the point in a term weight curve where that curve becomes flat. A term generally is important and remains part of the profile as long as its weight and the weight of the next term may be differentiated. When terms' weights are not differentiable, then they are not significant and may be cut off. Reducing the number of terms used in a profile increases the efficiency and effectiveness of the information retrieval process.

28 Claims, 6 Drawing Sheets

| REUTERS | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.5231 | 80 | 0.5231 | 80 | 0.5164 | 60 | 0.5164 | 60 | 0.5317 | 50 | 0.5317 | 50 |
| $(\alpha, L)$ BEST | 0.5459 (8, 3) | 29 | 0.5513 (8, 3) | 33 | 0.5176 (8, 4) | 49 | 0.5145 (8, 6) | 222 | 0.5300 (6, 3) | 37 | 0.5513 (8, 3) | 78 |
| (8, 3) | 0.5459 | 29 | 0.5513 | 33 | 0.5152 | 21 | 0.5153 | 15 | 0.5239 | 42 | 0.5513 | 78 |
| (8, 6) | 0.5183 | 60 | 0.5145 | 196 | 0.5066 | 62 | 0.5145 | 222 | 0.5233 | 53 | 0.5100 | 160 |

(A) REUTERS

| AP | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.2732 | 70 | 0.2820 | 180 | 0.2636 | 80 | 0.2754 | 180 | 0.2318 | 80 | 0.2512 | 220 |
| $(\alpha, L)$ BEST | 0.2735 (8, 6) | 65 | 0.2648 (8, 4) | 206 | 0.2861 (8, 6) | 64 | 0.2787 (8, 6) | 220 | 0.2283 (8, 6) | 58 | 0.2486 (8, 6) | 209 |
| (8, 3) | 0.2675 | 40 | 0.2377 | 38 | 0.2432 | 21 | 0.2338 | 11 | 0.2233 | 53 | 0.2386 | 177 |
| (8, 6) | 0.2735 | 65 | 0.2615 | 249 | 0.2861 | 64 | 0.2787 | 220 | 0.2283 | 58 | 0.2486 | 209 |

(B) AP

| WSJ | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.2487 | 70 | 0.2515 | 120 | 0.2571 | 80 | 0.2608 | 280 | 0.2317 | 80 | 0.2362 | 280 |
| $(\alpha, L)$ BEST | 0.2458 (6/8, 6) | 75 | 0.2449 (8, 7) | 283 | 0.2398 (8, 6) | 66 | 0.2509 (8, 7) | 248 | 0.2319 (8, 6/4) | 74 | 0.2144 (6, 4) | 198 |
| (8, 3) | 0.2350 | 47 | 0.2286 | 55 | 0.2038 | 19 | 0.2163 | 11 | 0.2177 | 62 | 0.2055 | 126 |
| (8, 6) | 0.2458 | 77 | 0.2446 | 279 | 0.2398 | 66 | 0.2494 | 221 | 0.2317 | 74 | 0.2107 | 207 |

(C) WSJ

| FBIS | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.1336 | 30 | 0.1336 | 30 | 0.1013 | 80 | 0.1211 | 100 | 0.1326 | 80 | 0.1543 | 280 |
| $(\alpha, L)$ BEST | 0.1181 (8, 4) | 69 | 0.1216 (6, 3) | 62 | 0.0977 (8, 6) | 75 | 0.0848 (6, 6) | 218 | 0.1254 (8, 7) | 64 | 0.1479 (8, 6) | 207 |
| (8, 3) | 0.1107 | 51 | 0.1182 | 79 | 0.0712 | 27 | 0.0700 | 28 | 0.1219 | 56 | 0.1237 | 125 |
| (8, 6) | 0.1176 | 72 | 0.1050 | 272 | 0.0977 | 75 | 0.0846 | 239 | 0.1246 | 65 | 0.1479 | 207 |

(D) FBIS

*FIG. 6*

| REUTERS | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.5231 | 80 | 0.5231 | 80 | 0.5164 | 60 | 0.5164 | 60 | 0.5317 | 50 | 0.5317 | 50 |
| PERC BEST | 0.5403 0.1 | 30 | 0.5428 0.25 | 29 | 0.5178 0.01 | 60 | 0.5153 0.1 | 45 | 0.5300 0.05 | 48 | 0.5186 0.05 | 146 |
| REC. | 0.5399 0.05 | 44 | 0.5079 0.05 | 114 | 0.5178 0.01 | 60 | 0.5044 0.01 | 173 | 0.5227 0.01 | 56 | 0.5143 0.01 | 186 |

(A) REUTERS

| AP | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.2732 | 70 | 0.2820 | 180 | 0.2636 | 80 | 0.2754 | 180 | 0.2318 | 80 | 0.2512 | 220 |
| PERC BEST | 0.2734 0.05 | 43 | 0.2802 0.05 | 131 | 0.2604 0.01 | 58 | 0.2765 0.01 | 189 | 0.2272 0.01 | 59 | 0.2504 0.01 | 221 |
| REC. | 0.2734 0.05 | 43 | 0.2802 0.05 | 131 | 0.2604 0.01 | 58 | 0.2765 0.01 | 189 | 0.2272 0.01 | 59 | 0.2504 0.01 | 221 |

(B) AP

| WSJ | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED, BEST | 0.2487 | 70 | 0.2515 | 120 | 0.2571 | 80 | 0.2608 | 280 | 0.2317 | 80 | 0.2362 | 280 |
| PERC BEST | 0.2489 0.05 | 49 | 0.2488 0.05 | 139 | 0.2540 0.01 | 64 | 0.2582 0.01 | 201 | 0.2293 0.01 | 68 | 0.2365 0.01 | 229 |
| REC. | 0.2489 0.05 | 49 | 0.2488 0.05 | 139 | 0.2540 0.01 | 64 | 0.2582 0.01 | 201 | 0.2293 0.01 | 68 | 0.2365 0.01 | 229 |

(C) WSJ

| FBIS | ROCCHIO | | | | ROCCHIOFQ | | | | PROB2 | | | |
|---|---|---|---|---|---|---|---|---|---|---|---|---|
| | 80 | | 300 TERMS | | 80 | | 300 | | 80 | | 300 | |
| | AVG. PREC. | # OF TRMS | AVG. PREC. | # TRMS | AVG. PREC. | # OF TRMS | AVG. PREC. | # OF TRMS | AVG. PREC. | # OF TRMS | AVG. PREC. | # OF TRMS |
| FIXED | 0.1336 | 30 | 0.1336 | 30 | 0.1013 | 80 | 0.1211 | 100 | 0.1326 | 80 | 0.1543 | 280 |
| PERC BEST | 0.1276 0.1 | 38 | 0.1229 0.25 | 37 | 0.0993 0.01 | 67 | 0.1000 0.01 | 225 | 0.1285 0.01 | 64 | 0.1535 0.01 | 229 |
| REC. | 0.1261 0.05 | 52 | 0.1141 0.05 | 165 | 0.0993 0.01 | 67 | 0.1000 0.01 | 225 | 0.1285 0.01 | 64 | 0.1535 0.01 | 229 |

(D) FBIS

*FIG. 7*

METHOD AND APPARATUS FOR DATABASE RETRIEVAL UTILIZING VECTOR OPTIMIZATION

FIELD OF THE INVENTION

The present invention relates generally to the field of information retrieval. In particular, the present invention relates to a method and apparatus for selecting the optimal number of terms for retrieving documents using a vector space analysis technique.

BACKGROUND OF THE INVENTION

Advances in electronic storage technology have resulted in the creation of vast databases of documents stored in electronic form. These databases can be accessed from remote locations around the world. As a result, vast amounts of information are available to a wide variety of individuals. Moreover, information is not only stored in electronic form but it is created in electronic form and disseminated throughout the world. Sources for the electronic creation of such information include news, periodicals, as well as radio, television and Internet services. All of this information is also made available to the world through computer networks, such as the worldwide web, on a real time basis. The problem with this proliferation of electronic information, however, is how any one individual may access useful information in a timely manner.

When a user wants to search for information, she may provide a computer system with a query or description of her interest. For example, a user interested in sport may type the query "basketball from Olympics '96" (the query is a phrase) or may just type the terms "basketball", and "Olympic '96". Using grammar rules and a lexicon, a search engine may extract the terms from the query and construct its internal representation of the query, called a profile. In the above examples, the profile will contain the terms "basketball" and "Olympics '96".

Profile training is the process of improving the formulation of a profile using a set of documents that the user considers representative for her interest (training data). The search engine extracts new terms from the training data and adds them to the initial profile. For example, after entering the query "basketball from Olympics '96", the user may point the system to an article that describes a basketball game from two days ago. From this article, the system extracts the terms "basketball", "game", "ball", and "score". Then the profile will contain the terms "basketball", "Olympics '96", "game", "ball", and "score". The user may even not provide any initial description of her interest (in which case, the initial profile is empty), but just give the system some training data to extract terms from. In the above example, without an initial description, the profile will contain only the terms extracted from the article, "basketball", "game", "ball", and "score".

The main input components of profile training are the initial description, the training database, the reference database, and the terms extraction algorithm. The training database contains articles that match the user's interest (training data). The terms extraction algorithm extracts terms from the training data and adds them to the profile. The reference database contains information that helps the extraction algorithm to decide whether or not to include in the profile a term from the training data. This is because the training data may contain terms that are not related to the user's interest and if included in the profile, may return non-relevant documents. In the above example, if the training article mentions that a basketball player likes piano, then adding the term "piano" to the profile will make the search engine retrieve articles related to music, which do not correspond to the user's interest in basketball. The assumption in using a reference database is that the terms extraction algorithm differentiate between the terms in the training data that are linked to the user's interest and the terms that are not.

Typically, the training documents contain a large number of terms. Selecting only the most representative terms from this set can improve efficiency and effectiveness of the retrieval process. To make use of training documents, a terms extraction algorithm creates a list of all the terms from the training data. To every term it attaches a weight based on the information in the reference database. The terms are then sorted in decreasing order of their weights, such that the term with the highest weight is the first. If the search engine wants to add to the profile n terms from the training data, then the first n terms from the sorted list of terms are added to the profile. Therefore, to train a profile we need two important elements: (1) a method to assign weights to the terms, and (2) a cut-off method to determine the number of terms to be added in a profile.

There have been may term selection methods proposed in literature based on the vector space and probabilistic models. Regardless of the method, the number of terms in a profile is generally the value for which experiments show a reasonable behavior (e.g., the first 30 or 50 terms) and it is a constant for all the profiles. There are also methods that associate a different number of terms to each profile. One example is to compute the number of terms with the formula $10+10 \log(T)$, where (T) is the number of training documents per profile. However, the number of terms chosen according to such a formula is generally too large and there are many cases when more flexibility is needed. For example, there are document collections in which many profiles achieve best average precision with just one term. Another method is to compute the sum of the weights for all the terms and add terms in a profile until a specified fraction of the sum is achieved. This approach, again, may not detect the situations when profiles need very few terms.

OBJECTS OF THE INVENTION

It is an object of the present invention to provide a method and apparatus to effect improved information extraction from a variety of data sources.

It is a further object of the present invention to improve information extraction by selecting the appropriate number of terms in creating a profile.

It is a further object of the present invention to improve information extraction by minimizing the number of terms in a profile.

BRIEF DESCRIPTION OF THE DRAWINGS

FIG. 6 illustrates the average precision and the average number of terms/profile for multiple databases calculated according to one embodiment of the present invention.

FIG. 7 illustrates the average precision and the average number of terms/profile for multiple databases calculated according to another embodiment of the present invention.

SUMMARY OF THE INVENTION

The present invention is a technique for optimizing the number of terms in a profile used for information extraction. This optimization is performed by estimating the number of terms which will substantively affect the information extraction process. That is, the technique estimates the point in a term weight curve where that curve becomes flat. A term generally is important and remains part of the profile as long as its weight and the weight of the next term may be differentiated. When terms' weights are not differentiable, then they are not significant and may be cut off. Reducing the number of terms used in a profile increases the efficiency and effectiveness of the information retrieval process.

DESCRIPTION OF THE PREFERRED EMBODIMENT OF THE PRESENT INVENTION

Figure 1:
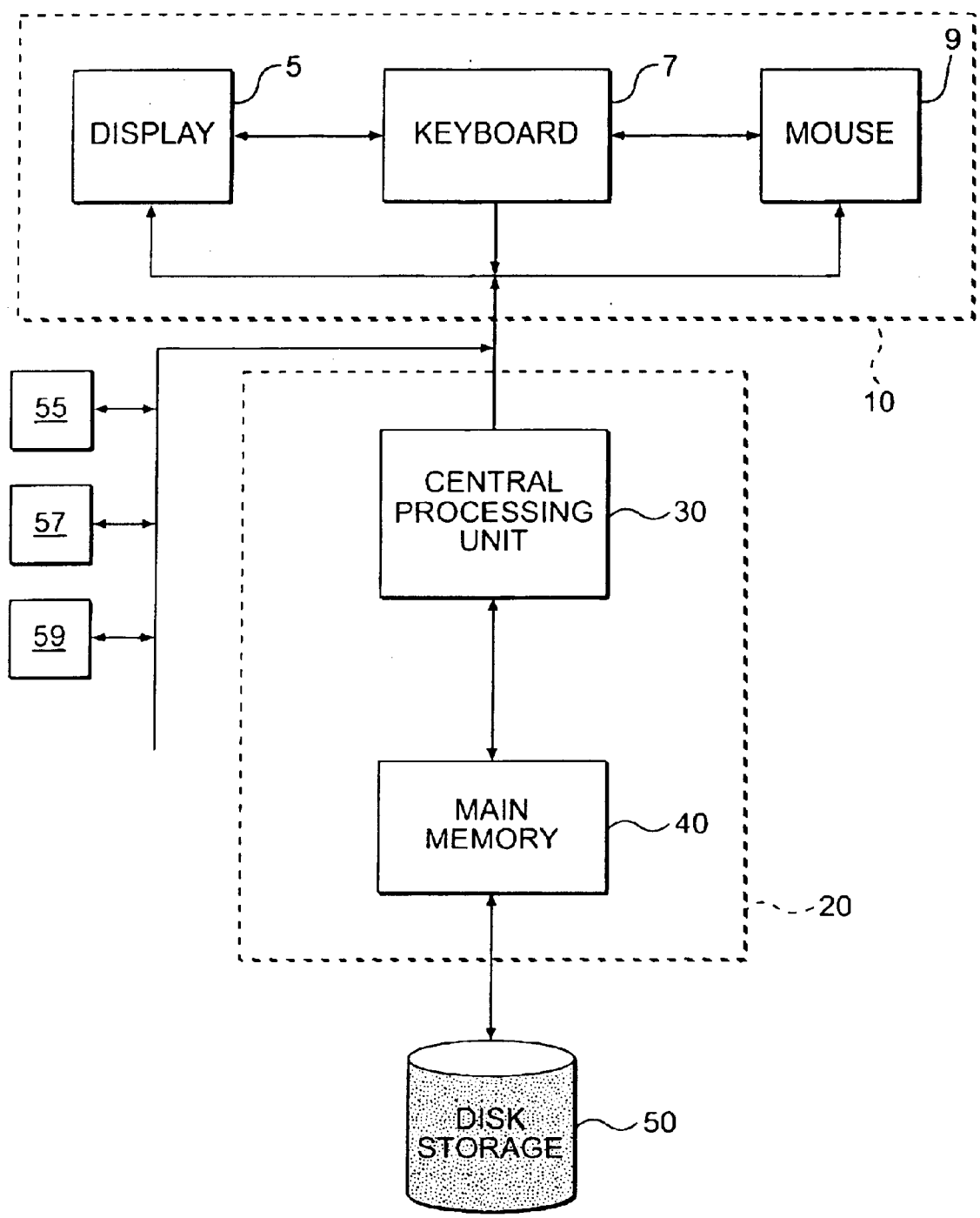
FIG. 1 is a block diagram that illustrates a computer system for performing information extraction according to one embodiment of the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. Furthermore, this computer system is connected to a variety of networks for communicating with other computers and obtaining access to remote databases. Among the networks connected to this computer system is the worldwide web 55, an intranet 57, private external network 59. In general, the disk storage unit 50 stores the program for operating the computer system and it stores the documents of the database. The computer 20 interacts with the I/O system 10 and the disk storage unit 50. The computer 20 executes operations according to instructions contained in a program that is retrieved from the disk storage unit 50. This program causes the computer 20 to retrieve the text of documents, or parts thereof, which are stored in a database located either in disk storage 50 or in a storage location accessible over a network. These instructions also cause information received over a network to be distributed to specific individuals over a network based on the content of the information.

According to the present invention, the program that performs the information extraction incorporates instructions to modify the profile based on the number of terms in the profile. Specifically, in the present invention, the initial number of terms in a profile is computed. This number of terms is then reduced by using the observation that there is a correlation between the curve of the terms' weights and the average precision achieved by a profile. More precisely, the average precision of a profile increases as long as the curve of weights is sharp. When the curve becomes flat, the average precision either remains constant or decreases.

Figure 2A:
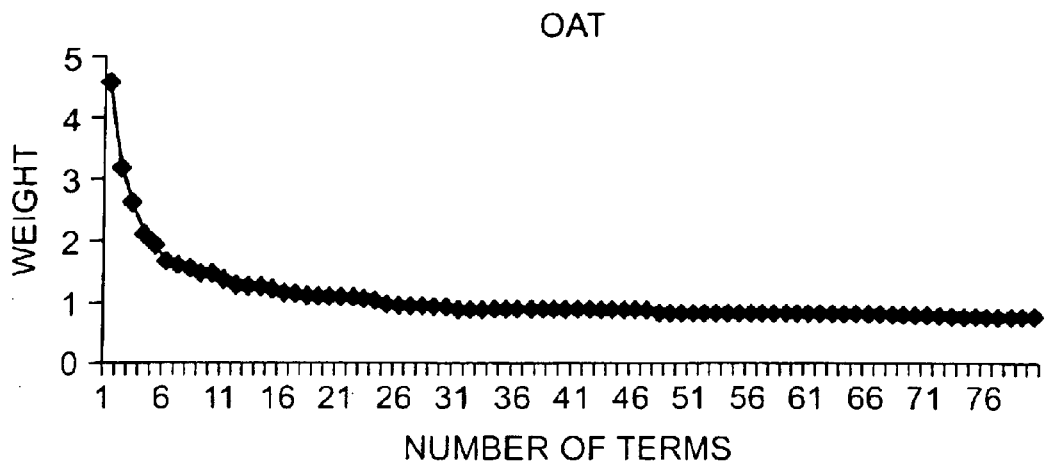
FIG. 2 illustrates the curve of terms' weights for three profiles according to one embodiment of the present invention.
Figure 2B:
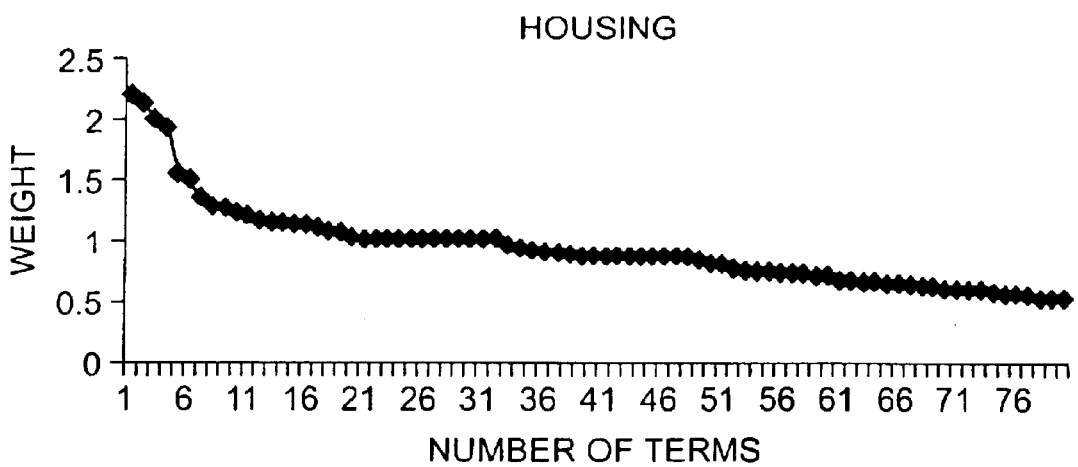

FIGS. 2(*a*)–(*b*) show the curve of terms' weights for two profiles of the Reuters collection: oat and housing, when Rocchio was used for term selection. Looking at FIGS. 2(*a*) and 2(*b*), we can see that the curve of terms' weights for profile oat becomes flat at around 10 terms, while the curve of terms' weights for profile housing is sharp for 80 terms. Adding more terms for profile oat hurts its average precision, whereas for profile housing, not adding more terms hurts its performance. From the examples above, if the number of terms for which the curve of terms' weights of a profile becomes flat was estimated, the average precision of the whole profile set (as the average precision of every profile increases) could be increased and the number of terms per profile could be reduced, which increases the efficiency of the system.

Figure 3:
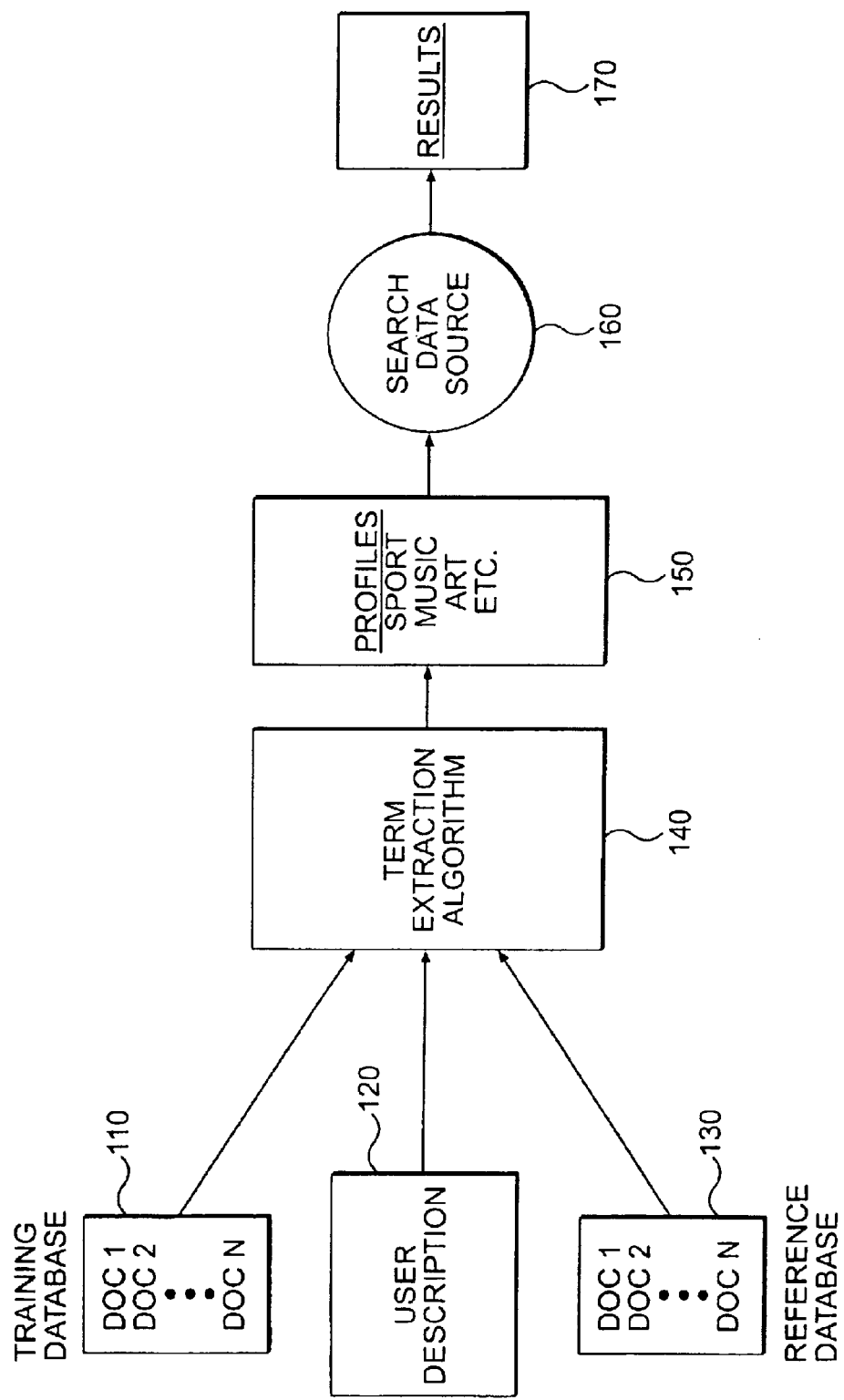
FIG. 3 illustrates a block diagram of a general profile training architecture according to one embodiment of the present invention.

FIG. 3 illustrates a block diagram for a system which uses training data to modify and/or generate profiles and to extract information based on those profiles. In particular, the inputs to the system consist of a user description 120, reference database 130 and training documents 110. The inputs are combined in a term extraction algorithm 140. This term extraction algorithm may be one of several conventional techniques such as Rocchio or RocchioFQ. As is well known, the term extraction algorithm determines a term weight based on, among other things, the term frequency in a document, the inverse document frequency of a term and the total number of training documents. The output of the term extraction algorithm 140 is one or more profiles 150 (e.g., sports, music, art, etc.). These profiles are then used by the information extraction process 160 to extract documents from a data source (e.g., a database or data stream) and create a result dataset 170.

The present invention modifies one or more of the profiles 150 by estimating the number of terms for which a profile achieves its maximum average precision in returning relevant documents and then reducing the profile to that number of terms. This estimation method uses the curve of terms' weights to determine the number of terms for which the curve becomes flat. The main concept behind the estimation method is the notion of a term's importance. A term is important as long as the difference between its weight and the weight of the next term is "significant", therefore as long as there is a differentiating characteristic between this term and the next one. When the differences between the term weights become very small or are the same, there is no differentiating characteristic among the terms, and they become unimportant.

Figure 4:
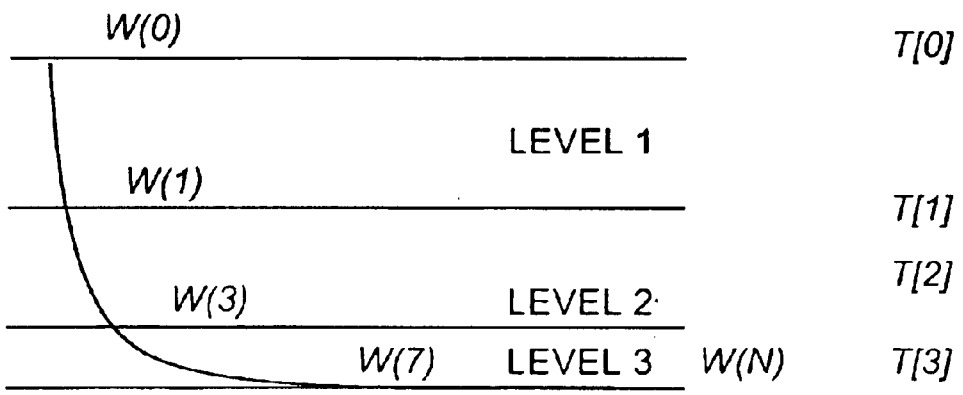
FIG. 4 illustrates a curve of term weights used for selecting the optimal number of terms according to one embodiment of the present invention.

Two techniques are described herein to carry out the method of the present invention. The first technique is used when the number of terms in the training documents is low (e.g., less than 80 terms). In the first technique, the first N terms are examined and are divided into their weight range in L levels or bins (see FIG. 4, where L=3). The values that divide two bins are called thresholds. In particular, level i is bounded by thresholds i−1, i. For a set of weights, w(0), w(1), w(2), . . . , w(N), the thresholds are computed as follows. The first threshold, T[0] equals w(0), the highest weight. The last threshold, T[L], equals the smallest weight. In general, threshold T[i] is the average of the previous threshold and the last threshold.

$$T[i] = \frac{T[i-1] + T[L]}{2}$$

For each level, we compute the number of weights that lay between the upper and lower thresholds. After that, in each level, we add terms to the profile until one of the next two conditions holds:

(1) $\alpha N_i < N_{i+1}$, where $\alpha$ is a coefficient that controls how many terms to add, $N_i$ is the number of weights at level i, and $N_{i+1}$ is the number of weights at level i+1, or (2) we have reached the last level.

The condition $\alpha N_i < N_{i+1}$, means that when the number of weights in a bin is smaller than the number of weights in the next bin, the process stops. This is under the assumption that when there is not much difference between the weights of the terms, the curve is flat and the number of the points in that level increases.

Figure 5:
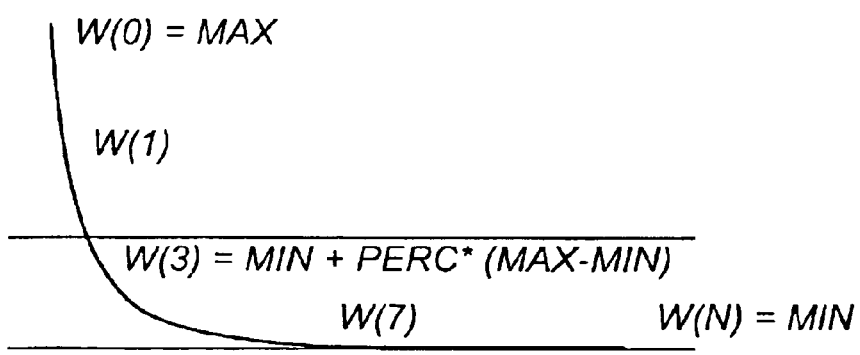
FIG. 5 illustrates a curve of term weights used for selecting the optimal number of terms according to one embodiment of the present invention.

The second technique is used when the number of terms in the training documents is large (greater than approximately 80 terms). This method is very similar to the previous one, but simpler. For the first N weights, we define "min" to be the value of the smallest weight and "max" to be the value of the largest weight (by analogy with the previous method, min is T[L] and max is T[0]). With these considerations, we add terms in a profile as long as the term weight w(t) satisfies the following formula:

$$w(t) >= min + perc*(max-min),$$

where perc (percentage) is a parameter. With this formula, as long as perc>0, we never take all N terms (see FIG. 5), whereas in the case of the first method, if condition (1) is not satisfied for any bin, we end up taking N terms.

To study the above described technique, the following corpora were analyzed: Reuters (approximately 30 terms per document), Associated Press (approximately 80 terms per document), Wall Street Journal (approximately 132 terms per document) and FBIS (approximately 220 terms per document). Ideally, for each term selection method (Rocchio, RocchioFQ, Prob2), the profile modification techniques will reduce the number of terms per profile while increasing or preserving the highest average precision obtained by that method with a fixed number of terms/profile. The first algorithm has three parameters: $\alpha$, Levels and N, the maximum number of terms on the curve of terms' weights. In the experiments we run, we varied $\alpha$ and Levels within the range [3,8], while N, we choose two values, 80 and 300. In general, as expected, the more levels we have and the larger $\alpha$ is, the more terms we choose.

FIG. 6 summarizes the results for each corpus. The first line in each table shows the baseline maximum average precision and number of terms, obtained where profiles have a fixed number of terms. The second line shows the maximum average precision and the average number of terms/profile obtained when using the levels cut-off algorithm and the corresponding ($\alpha$, Levels) values. The third and fourth lines show the values obtained with $\alpha=8$ and Levels=3 (settings that gave a very good behavior on Reuters) and respectively $\alpha=8$ and Levels=6 (settings that gave a reasonable behavior on AP, WSJ and FBIS). The values in bold letters correspond to the case when our algorithm achieves a better/very close average precision than/to the best average precision obtained with the corresponding term selection method, when all the profiles have the same number of terms. The notion "very close average precision" stands for the situations when the average precision obtained with our method is smaller than the maximum average precision with less than 0.005.

A rough look at the density of values in bold letters in FIG. 6 shows us that the first algorithm works very well on Reuters and AP, where it generally not only reduces the number of terms/profile, but it also increases the maximum average precision. On Reuters, the maximum average precision is 0.5317 and it is obtained with Prob2 and 50 terms. With Rocchio, the new algorithm achieves an average precision of 0.5459 with 29 terms, increasing the average precision by 2.67%, while decreasing the number of terms by 64%. With an upper bound of 300 terms, the new method achieves with Rocchio an average precision of 0.5513 with 33 terms, a 3.68% increase in the maximum average precision obtained on this collection. For RocchioFQ, it achieves the same average precision obtained by this method with a fixed number of terms, but with a 18.3% decrease in the number of terms/profile.

On AP, the maximum average precision is 0.2820 obtained with Rocchio and 180 terms. The new method achieves with RocchioFQ an average precision of 0.2861 with just 64 terms, an increase of 3.88% in the average precision and a reduction of 65% in the number of terms. The behavior is reasonable on WSJ, where in the case of an upper bound of 80 terms, the values are very close to the baseline ones, for Rocchio and Prob2. On FBIS, excepting RocchioFQ, it achieves a lower performance than the one obtained with a fixed number of terms. As we can see from FIG. 5, a setting of $\alpha=8$ and Levels=3 achieves a very good behavior on Reuters, while the values $\alpha=8$ and Levels=6 achieve a good behavior on the rest of the collections. $\alpha=8$ and Levels=6 is not a combination that works well on Reuters and similarly, a setting of $\alpha=8$ and Levels=3 would not work well on AP, WSJ and FBIS.

Comparing now the behavior of each method, in the case of an upper bound of 80 terms/profile, we note the followings. The new method works very well with Rocchio on Reuters, AP and WSJ. The worse behavior on FBIS is due to the fact that most of the times the number of selected terms is too large. With RocchioFQ, the behavior is very good on Reuters and AP, reasonable on FBIS, but not that good on WSJ. This is because on WSJ there are both profiles with too few terms and profiles with too many terms. With Prob2, the behavior is very good on Reuters, AP and WSJ, and reasonable on AP and FBIS, where again we take a too large number of terms. The values obtained when the curve of terms' weights has 300 terms are generally lower (excepting Reuters collection) than the ones obtained with a fixed number of terms. This is because we mostly select too many terms.

The second profile optimization technique has only two parameters: the percentage of the difference between the highest and smallest weights (perc) and the upper bound of the number of terms per profile, N. For these experiments, perc had the values 0.25, 0.1, 0.05, 0.01, while N had the values 80 and 300. As expected, the larger the value of perc, the more terms we choose.

FIG. 7 summarizes the results for each corpus. Similarly with the results reported for the first method, the first line in each table shows the maximum average precision and the corresponding number of terms, when all the profiles have the same number of terms. The second line shows the maximum average precision and the average number of terms/profile obtained with the second algorithm and the corresponding percentage. The third line (called Rec. from recommended) shows the values obtained with perc=0.05 for Rocchio and 0.01 for RocchioFQ and Prob2, settings that generally gave a good behavior on all the collections. Again, the values in bold letters correspond to the case when our algorithm achieves a better/very close average precision than the best average precision obtained with the corresponding term selection method, when all the profiles have the same number of terms.

On Reuters, the algorithm behaves very well, as the first algorithm also does. With Rocchio, we achieve an average precision of 0.5403 with 30 terms, an increase of 1.61% from the maximum average precision obtained with a fixed number of terms (Prob2, 0.5317, with 50 terms) and a 40% reduction in the number of terms. With an upper bound of 300 terms/profile, Rocchio achieves an average precision of 0.5428, with only 29 terms. For Rocchio, the new approach generally decreases the number of terms, while increasing/keeping the highest average precision obtained with a fixed number of terms per profile. Exception to this is Prob2 with an upper bound of 300 terms, where we take too many terms.

On AP and WSJ the behavior is again very good. On AP, the maximum average precision is 0.2820 obtained with Rocchio 180 terms. The algorithm achieves an average precision of 0.2802 with 131 terms, resulting in a 21% reduction in the number of terms. For all the methods, the new approach generally decreases the number of terms while keeping the same the maximum average precision obtained with a fixed number of terms. The cases when the maximum average precision is slightly lower, are due to the fact that we generally take too many terms.

On WSJ with an upper bound of 88 terms, the maximum average precision obtained with Rocchio is 0.2487 with 80 terms. The second algorithm achieves 0.2489 with just 49 terms, a 30% reduction in the number of terms. Similarly, for RocchioFQ, the maximum average precision is 0.2571, obtained with 80 terms. The new algorithm achieves 0.2540 with just 64 terms, a 20% reduction in the number of terms. For Prob2 with 300 terms, it achieves a slightly higher average precision, with a 25.3% reduction in the number of terms. On FBIS the behavior is very good for Prob2 with an upper bound of 300 terms, where we reach the maximum average precision with a 25.3% reduction in the number of terms and good for the other methods with both 80 and 300 terms. The situations where the average precision is slightly lower are again due to the fact that we take too many terms.

While this invention has been particularly described and illustrated with reference to a preferred embodiment, it will be understood by one of skill in the art that changes in the above description or illustrations may be made with respect to form or detail without departing from the spirit and scope of the invention.

We claim:

1. A method of information retrieval, comprising the steps of:
    creating a profile having a number of terms;
    determining a term weight for each term in said profile;
    estimating a point at which a curve representing said term weights and a number of terms in a profile becomes flat;
    using said estimated point to determine a term weight threshold;
    modifying said profile to remove terms having a weight less than said term weight threshold; and
    analyzing a data source using said modified profile to retrieve information.

2. A method of information retrieval, comprising the steps of:
    creating a profile having a number of terms;
    determining a term weight for each term in said profile;
    organizing said terms in an order according to said term weight;
    dividing said term weights into a plurality of bins wherein the number of term weights in a bin satisfies the condition that (alpha×Ni) is greater than Ni+1, wherein alpha is a coefficient indicative of how many of said terms are added, wherein (i) corresponds to a specific bin number; and
    modifying said profile to contain only terms from one or more of said bins.

3. A method as in claim 2, wherein alpha is less than 10.

4. A method of information retrieval, comprising the steps of:
    creating a profile having a number of terms;
    determining a term weight for each term in said profile;
    selecting a minimum weight (wmin) using said term weights;
    selecting a maximum weight (wmax) using said term weights;
    modifying said profile wherein each term in said profile has a weight not less than approximately (wmin+ (alpha×(wmax−wmin)) wherein alpha is a percentage selected from the range of zero to one; and
    analyzing a data source using said modified profile to retrieve information.

5. A method, as in claim 4, wherein alpha is approximately 0.05.

6. A method of information retrieval, comprising the steps of:
    creating a profile having a number of terms;
    determining a term weight for each term in said profile;
    selecting a maximum weight (wmax) using said term weights;
    selecting a minimum weight (wmin) using said term weights;
    organizing said terms in an order according to said term weight;
    determining the difference in weight between adjacent terms in said order;
    modifying said profile when said difference between said adjacent terms is less than approximately (beta× (wmax−wmin)) wherein beta is a percentage selected from the range of zero to one; and
    analyzing a data source using said modified profile to retrieve information.

7. A method, as in claim 6, wherein beta is approximately 0.01.

8. A method for retrieving information, comprising:
    entering a request for information in a first computer system;
    transmitting said request to a second computer system over a communications network;
    creating a profile having a number of terms corresponding to said request in said second computer system;
    determining a term weight for each term in said profile;
    estimating a point at which a curve representing said term weights and a number of terms in a profile becomes flat;
    using said estimated point to determine a term weight threshold;
    modifying said profile to remove terms having a weight less than said term weight threshold; and
    analyzing a data source using said modified profile to retrieve information.

9. A method of information retrieval, comprising the steps of:
    entering a request for information in a first computer system;
    transmitting said request to a second computer system over a communications network;
    creating a profile having a number of terms;
    determining a term weight for each term in said profile;
    organizing said terms in an order according to said term weight;
    dividing said term weights into a plurality of bins wherein the number of term weights in a bin satisfies the condition that (alpha×Ni) is greater than Ni+1, wherein alpha is a coefficient indicative of how many of said terms are added, wherein (i) corresponds to a specific bin number; and
    modifying said profile to contain only terms from one or more of said bins.

10. A method as in claim 9, wherein alpha is less than 10.

11. A method of information retrieval, comprising the steps of:

entering a request for information in a first computer system;

transmitting said request to a second computer system over a communications network;

creating a profile having a number of terms corresponding to said request in said second computer system;

determining a term weight for each term in said profile;

selecting a minimum weight (wmin) using said term weights;

selecting a maximum weight (wmax) using said term weights;

modifying said profile wherein each term in said profile has a weight not less than approximately (wmin+ (alpha×(wmax−wmin))) wherein alpha is a percentage selected from the range of zero to one; and analyzing a data source using said modified profile to retrieve information.

12. A method, as in claim 11, wherein alpha is approximately 0.05.

13. A method of information retrieval, comprising the steps of:

entering a request for information in a first computer system;

transmitting said request to a second computer system over a communications network;

creating a profile having a number of terms corresponding to said request in said second computer system;

determining a term weight for each term in said profile;

selecting a maximum weight (wmax) using said term weights;

selecting a minimum weight (wmin) using said term weights;

organizing said terms in an order according to said term weight;

determining the difference in weight between adjacent terms in said order;

modifying said profile when said difference between said adjacent terms is less than approximately (beta× (wmax−wmin)) wherein beta is a percentage selected from the range of zero to one; and analyzing a data source using said modified profile to retrieve information.

14. A method, as in claim 13, wherein beta is approximately 0.01.

15. A method for retrieving information, comprising:

receiving a request for information from a communications network;

creating a profile having a number of terms corresponding to said request;

determining a term weight for each term in said profile;

estimating a point at which a curve representing said term weights and a number of terms in a profile becomes flat;

using said estimated point to determine a term weight threshold;

modifying said profile to remove terms having a weight less than said term weight threshold;

analyzing a data source using said modified profile to retrieve information; and transmitting said retrieved information over said communication network.

16. A method of information retrieval, comprising the steps of:

receiving a request for information from a communications network;

creating a profile having a number of terms;

determining a term weight for each term in said profile;

organizing said terms in an order according to said term weight;

dividing said term weights into a plurality of bins wherein the number of term weights in a bin satisfies the condition that (alpha×Ni) is greater than Ni+1, wherein alpha is a coefficient indicative of how many of said terms are added, wherein (i) corresponds to a specific bin number; and modifying said profile to contain only terms from one or more of said bins.

17. A method as in claim 16, wherein alpha is less than 10.

18. A method of information retrieval, comprising the steps of:

receiving a request for information from a communications network;

creating a profile having a number of terms corresponding to said request;

determining a term weight for each term in said profile;

selecting a minimum weight (wmin) using said term weights;

selecting a maximum weight (wmax) using said term weights;

modifying said profile wherein each term in said profile has a weight not less than approximately (wmin+ (alpha×(wmax−wmin))) wherein alpha is a percentage selected from the range of zero to one;

analyzing a data source using said modified profile to retrieve information; and transmitting said retrieved information over said communications network.

19. A method, as in claim 18, wherein alpha is approximately 0.05.

20. A method of information retrieval, comprising the steps of:

receiving a request for information from a communications network;

creating a profile having a number of terms corresponding to said request;

determining a term weight for each term in said profile;

selecting a maximum weight (wmax) using said term weights;

selecting a minimum weight (wmin) using said term weights;

organizing said terms in an order according to said term weight;

determining the difference in weight between adjacent terms in said order;

modifying said profile when said difference between said adjacent terms is less than approximately (beta× (wmax−wmin)) wherein beta is a percentage selected from the range of zero to one;

analyzing a data source using said modified profile to retrieve information; and transmitting said retrieved information over said communication network.

21. A method, as in claim 20, wherein beta is approximately 0.01.

22. A system for retrieving information from a data source, comprising:
   a central processing unit coupled to a memory unit and an input system;
   said central processing unit executes instructions retrieved from said memory in response to commands entered into said input system;
   said instructions cause said central processing unit to:
   i) create a profile having a number of terms;
   ii) determine a term weight for each term in said profile;
   iii) estimate a point at which a curve representing said term weights and a number of terms in a profile becomes flat;
   iv) determine said term weight threshold using said estimated point;
   iv) modify said profile to remove terms having a weight less than said term weight threshold; and
   v) analyze a data source using said modified profile to retrieve information.

23. A system for retrieving information from a data source, comprising:
   a central processing unit coupled to a memory unit and an input system;
   said central processing unit executes instructions retrieved from said memory in response to commands entered into said input system;
   said instructions cause said central processing unit to:
   i) create a profile having a number of terms;
   ii) determine a term weight for each term in said profile;
   iii) organize said terms in an order according to said term weight;
   iv) divide said term weights into a plurality of bins wherein the number of term weights in a bin satisfies the condition that (alpha×Ni) is greater than Ni+1, wherein alpha is a coefficient indicative of how many of said terms are added, wherein (i) corresponds to a specific bin number;
   v) modify said profile to contain only terms from one or more of said bins; and
   vi) analyze a data source using said modified profile to retrieve information.

24. A system as in claim 23 wherein alpha is less than 10.

25. A system for retrieving information from a data source, comprising:
   a central processing unit coupled to a memory unit and an input system;
   said central processing unit executes instructions retrieved from said memory in response to commands entered into said input system;
   said instructions cause said central processing unit to:
   i) create a profile having a-number of terms;
   ii) determine a term weight for each term in said profile;
   iii) select a minimum weight (wmin) using said term weights;
   iv) select a maximum weight (wmax) using said term weights;
   v) modify said profile wherein each term in said profile has a weight not less than approximately (wmin+ (alpha×(wmax−wmin)) wherein alpha is a percentage selected from the range of zero to one.

26. A system, as in claim 25, wherein alpha is approximately 0.05.

27. A system for retrieving information from a data source, comprising:
   a central processing unit coupled to a memory unit and an input system;
   said central processing unit executes instructions retrieved from said memory in response to commands entered into said input system;
   said instructions cause said central processing unit to:
   i) create a profile having a number of terms;
   ii) determine a term weight for each term in said profile;
   iii) select a maximum weight (wmax) using said term weights;
   iv) select a minimum weight (wmin) using said term weights;
   v) organize said terms in an order according to said term weight;
   vi) determine the difference in weight between adjacent terms in said order; and
   vii) remove a term from said profile when said difference between said adjacent terms is less than approximately (beta×(wmax−wmin)) wherein beta is a percentage selected from the range of zero to one.

28. A system, as in claim 21, wherein beta is approximately 0.01.

* * * * *